Figure 1:
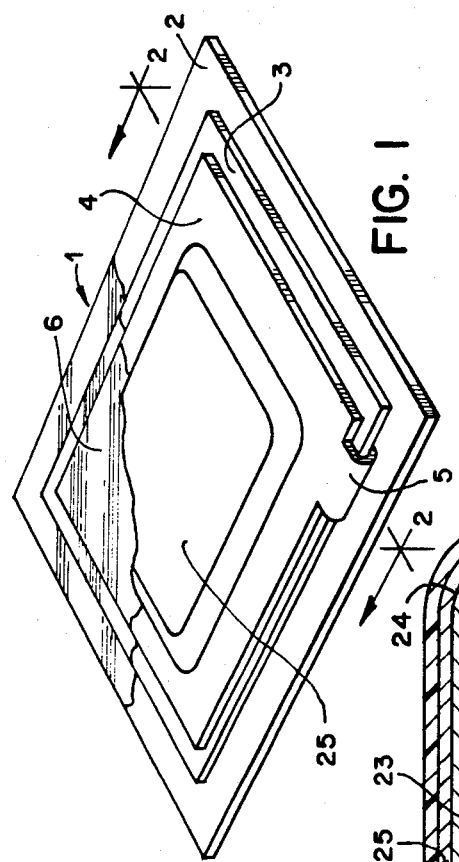

United States Patent [19]
Plasse

[11] 4,389,470
[45] Jun. 21, 1983

[54] LAMINAR CELLS AND BATTERIES
[75] Inventor: Paul A. Plasse, Lexington, Mass.
[73] Assignee: Polaroid Corporation, Cambridge, Mass.
[21] Appl. No.: 295,268
[22] Filed: Aug. 24, 1981
[51] Int. Cl.³ .......................................... H01M 6/46
[52] U.S. Cl. .................................. 429/152; 429/144; 429/162; 429/178
[58] Field of Search ............... 429/152, 162, 144, 145, 429/199–201, 229–231, 224, 178

[56] References Cited
U.S. PATENT DOCUMENTS

| 2,870,235 | 1/1959 | Soltis | 429/162 X |
| 3,440,110 | 4/1969 | Arbter | 429/144 |
| 3,615,861 | 10/1971 | Braem | 429/162 |
| 3,669,746 | 6/1972 | Devitt et al. | 429/145 X |
| 4,018,970 | 4/1977 | Jumel et al. | 429/162 |
| 4,019,251 | 4/1977 | McCole | 29/623.2 |
| 4,086,400 | 4/1978 | Hyland et al. | 429/122 |
| 4,105,831 | 8/1978 | Plasse | 429/86 |
| 4,119,770 | 10/1978 | Land | 429/152 |
| 4,254,191 | 3/1981 | Kniazzek | 429/162 |
| 4,256,813 | 3/1981 | Kniazzek | 429/86 |

Primary Examiner—Charles F. Lefevour
Attorney, Agent, or Firm—John W. Ericson

[57] ABSTRACT

A laminar battery comprising an end terminal formed with a pocket to accept internal components without requiring additional edge thickness in the seal area, incorporating as the separator in at least the cell immediately adjacent the pocketed end terminal a layer of cellophane together with a layer of paper on the side of the cellophane confronting the cathode.

5 Claims, 3 Drawing Figures

U.S. Patent   Jun. 21, 1983   4,389,470

LAMINAR CELLS AND BATTERIES

This invention relates to electrical cells and batteries, and particularly to a novel laminar battery construction employing a pocketed end terminal.

In copending U.S. Application for Letters Patent Ser. No. 295,269 filed on Aug. 24, 1981 by Paul A. Plasse for Laminar Batteries and Methods of Making the Same and assigned to the assignee of this invention, a laminar battery construction is disclosed in which a plurality of cells is terminated by a metal collector sheet laminated to a sheet of conductive plastic, the end terminal laminate being deformed prior to assembly to form a pocket for the receipt of the electrochemically active components of the battery while allowing the periphery of the terminal to come down into contact with thin frames to form seals around the cells. Particularly for use in high drain applications, such batteries are preferably made with cathodes in the form of slurries of electrode particles in an aqueous electrolyte solution, employed in combination with a cellophane separator. The advantages of the cellophane separator in such a construction are set forth in U.S. Pat. No. 4,119,770.

Following the sealing of such batteries, problems have been encountered, particularly in the cell adjacent the pocketed terminal, which are manifested as a corrosion of the metal end terminal collector sheet. While various causes have been proposed for this problem, one explanation is that liquid electrolyte exuded by the slurry cathode may come in contact with a region of the pocketed end terminal in which the conductive plastic protective layer confronting the cathode, and included to protect the end terminal from chemical attack, has been weakened either during the formation of the pocket in the end terminal or during the sealing operation, or both. The result is that fissures may develop in the conductive plastic that will allow the liquid electrolyte to permeate through and attack the end terminal. The object of this invention is to obviate the effects of any weakening that may occur in the conductive plastic underlying the pocketed metal end terminal in a construction of this type.

Briefly, the above and other objects of the invention are attained by a battery construction in which at least the cell adjacent the pocketed end terminal comprises a composite separator including a thin sheet of paper in contact with the slurry cathode and a cellophane separator underlying the paper sheet and in contact with the other electrode of the cell. In this construction, the cellophane separator performs the highly desirable function of inhibiting carbon particle migration between the electrodes that might result in interelectrode shorts. The paper component of the separator greatly inhibits the migration of electrolyte from the cathode beyond the area in which the cathode was initially deposited, without appreciably affecting the internal impedance of the cell.

The invention will best be understood in the light of the following detailed description, together with the accompanying drawings, illustrative of the invention.

Figure 3:
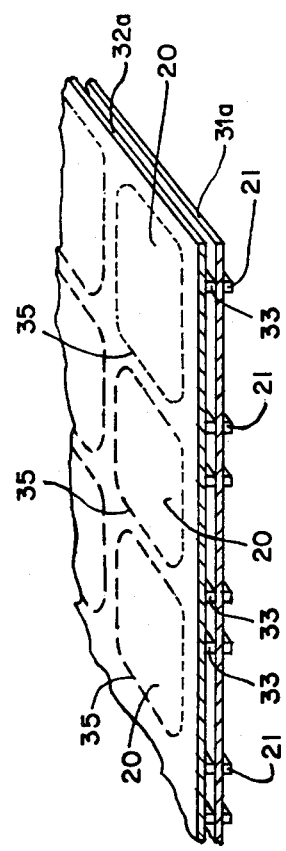
Figure 2:
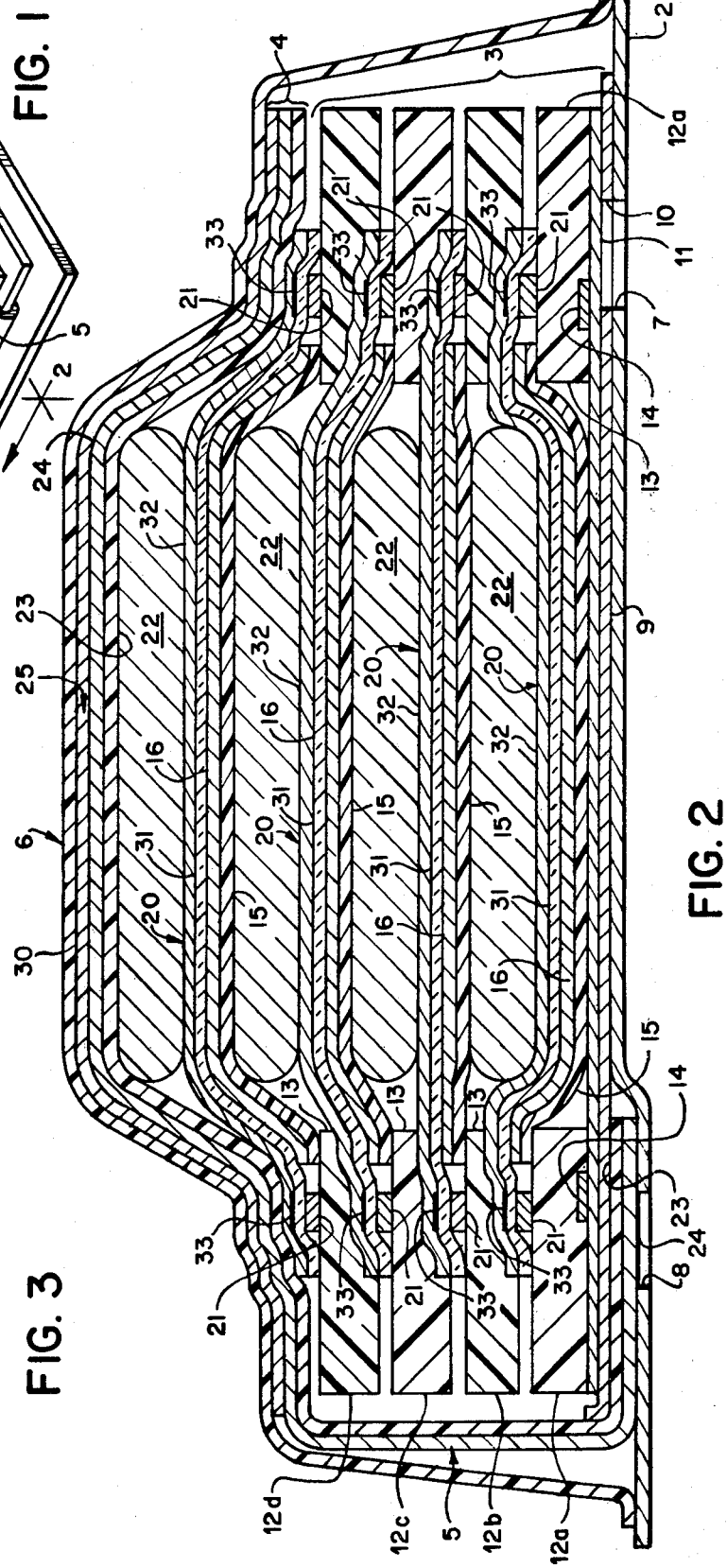

In the drawings,

FIG. 1 is a schematic three-quarter perspective sketch of a completed battery in accordance with the invention;

FIG. 2 is a cross-sectional schematic elevational view, with vertical dimensions exaggerated with respect to horizontal dimensions and on an enlarged scale, of a cross-section through the battery of FIG. 1 as seen substantially along the lines 2—2 in FIG. 1; and FIG. 3 is a fragmentary diagrammatic three quarter perspective sketch of a composite web useful in the manufacture of separators in accordance with the invention, with parts shown in cross section and parts broken away.

FIG. 1 shows a completed laminar battery which, in accordance with a preferred embodiment of the invention, may be generally similar in its external appearance to the familiar thin flat battery packaged within a Polaroid SX-70 Land film pack, except that for the same number of cells and a similar electrical capacity, it will generally be of somewhat smaller major dimensions and somewhat greater in thickness than the conventional battery. In its external aspects, the battery 1 comprises a card 2 of construction paper, cardboard or the like, which may be pigmented on one or both sides and printed with chosen indicia in any desired manner. The card 2 serves as the base of the completed battery and is preferably dimensioned to be accepted in the desired power supply receptacle for which the battery is intended, such as a film pack, cassette recorder, calculator, camera or the like.

The card 2 is laminated in selected regions to a battery comprising a set of components 3 to be described in more detail below, over which there is adhered a pocketed terminal sheet 4 of conductive material. The terminal sheet 4 is preferably formed with a tab 5 wrapped around the other components 3 of the battery to present an active terminal on the opposite side in a manner generally familiar to those skilled in the art.

An overwrap layer 6 is preferably laminated to the card 2 over the active components of the battery as illustrated in FIGS. 1 and 2. The overlap layer 6 may be of any suitable inert, chemically stable material, and serves primarily to prevent mechanical interference with underlying components during manipulation of the battery. Polyethylene has been successfully employed for this purpose, although it has a tendency to shrink during heat-sealing that may cause other more dimensionally stable materials such as paper, glassine or various commercially available paper-foil laminates to be preferred.

While the battery 1 may comprise one or any desired number of cells, for purposes of convenience and to illustrate a preferred embodiment for many applications, a four cell battery will be described.

Referring to FIG. 2, the card 2 is provided with a pair of perforations 7 and 8 through which the positive and negative terminals of the battery are accessible. It will be apparent to those skilled in the art as the description proceeds that the battery to be described could be assembled with an anode adjacent the card 2 and a cathode as the most remote electrode, or vice versa, but in accordance with a particularly preferred embodiment, the battery will be described as built up from anode to cathode, such that the negative terminal of the battery will be exposed through the aperture 7 on the card 2, and the positive terminal of the battery exposed through the aperture 8.

Referring to FIG. 2, on the card 2 is mounted an insulating base sheet 9 of kraft paper or the like, or most preferably of the material more fully shown and described in U.S. Pat. No. 4,036,400, the latter comprising a laminate of kraft paper, a thermoplastic liquid-impervious resin overlying the paper, and an overlayer on the resin of a heat sealing adhesive. The adhesive layer would be on the top side as seen in FIG. 2. The kraft paper side of the insulating sheet 9 may be selectively laminated to the card 2 by means of one or more strips of any suitable adhesive, such as poly(ethylene/vinyl acetate), not shown.

As shown in FIG. 2, the insulating sheet 9 is provided with an aperture 10 in registry with the aperture 7 in the card 2 to expose what, in this case, is the negative terminal of the battery comprising a sheet 11 of metal, preferably a sheet of aluminum foil, for example, of 2 mils in thickness.

The metal terminal sheet 11 is laminated to a selected region surrounding the aperture 10 in the insulating sheet 9, and to the peripheral borders of the sheet 9, but is not necessarily, and preferably is not, laminated to the insulating sheet in other regions.

The upper side of the metal terminal sheet 11 is preferably coated with a thin layer of conductive priming adhesive, not shown in FIG. 2, typically from 0.1 to 0.8 mils in thickness, and to this conductive adhesive surface is adhered an insulating frame 12a. The frame 12a is formed with a central aperture 13 which serves to receive other electrochemically active components in a manner to be described.

During the lamination of the frame 12a to the metal terminal sheet 11, one or preferably two vent strips 14 are preferably laminated between the frame 12a and the conductive plastic adhesive coated upper surface of the metal terminal sheet 11. The vent strips 14 may be made of paper or the like, which may be embedded in a thermoplastic resin prior to lamination into the structure shown, but are preferably simply laminated into the thermoplastic matrix comprising the frame 12a and the thin layer of conductive primer overlying the metal terminal sheet 11. These vent strips 14 serve to allow the egress of hydrogen formed during the life of the battery, and, together with the surrounding thermoplastic matrix, prevent the loss of appreciable amounts of water or the ingress of oxygen in a manner more fully illustrated and described in U.S. Pat. Nos. 4,105,831; 4,254,191; and 4,256,813, for example.

For convenience in the illustration of the several features of the battery 1 in a single view, the vent strips 14 are shown in FIG. 2 at 90 degrees to their preferred orientation relative to the tab 5. In accordance with the preferred embodiment of the invention, the strips 14 and the tab 5 are both aligned in the machine direction during battery assembly. However, the arrangement shown is equally efficacious in the completed battery.

An anode electrode structure comprising a sheet 15 of conductive plastic over which is coated a layer 16 of active anode material is located principally within the aperture 13 formed in the frame 12a and has external borders extending around and over the aperture 13, with the edges of the conductive plastic sheet 15 being laminated to the edges of the frame 12a around the borders of the aperture 13 and the central region of the conductive plastic sheet 15 being laminated to the conductive primer side of the conductive metal end terminal sheet 11 as shown in FIG. 2.

The conductive plastic sheet 15 may be made of any conventional material; for example, of Condulon conductive plastic as made and sold by Pervel Industries, Inc. of Plainfield, Conn. The coated anode particle layer 16 may be made of an aqueous composition comprising zinc powder and a little carbon black together with a binder, coated on the conductive plastic sheet and dried, in a manner described more fully, for example, in U.S. Pat. No. 4,119,770 in column 8, lines 40-63. Rather than being patch printed on the conductive plastic, the conductive zinc particle layer is preferably continuously coated on a conductive plastic web and later cut into patches of the kind shown at 15 and 16 in FIG. 2.

A presently preferred zinc anode coating composition, in percent by weight based on the weight of composition, is as follows:

| Component | Weight Percent |
|---|---|
| Zinc Powder | 75.78 |
| $H_2O$ | 19.25 |
| TSPP | 0.056 |
| Calgon 261 | 0.23 |
| Bentone LT | 0.14 |
| Polytex 6510 | 4.16 |
| Carbon Black | 0.38 |
| | 100.0 |

In the above composition, TSPP is tetrasodium pyrophosphate; Calgon 261 LVF is a low molecular weight poly(diallyl dimethyl ammonium chloride) as made and sold by Calgon Corporation of Pittsburgh, Pennsylvania; Bentone LT is an organic derivative of hydrous magnesium aluminum silicate, made and sold by National Lead Co., Inc. of N.Y., N.Y.; and Polytex 6510 is an acrylic emulsion resin made and sold by Celanese Corp. of Newark, N.J. The quantities of Polytex 6510 and Calgon 261 LVF are as solids, excluding water. This composition is uniformly coated on the conductive plastic substrate and dried.

Overlying the anode layer 16 in FIG. 2 is a composite separator generally designated 20. The separator 20 comprises a sheet 31 of any suitable electrolyte permeable material that is relatively impervious to penetration by migrating carbon particles, and preferably of cellophane free of humectants and plasticizers, in contact with the electrode layer 16. Overlying the cellophane sheet 31 is a sheet 32 of bibulous material, such as any of the various non-woven fibrous materials conventionally employed as battery separators, and preferably of thin paper, glassine or the like about 0.5 to 1.5 mils in thickness.

The cellophane layer 31 is adhered to selected regions of the confronting faces of the frame 12a. For reasons described more fully in the above-cited U.S. application Ser. No. 295,269, the cellophane layer 31 is preferably not fully attached along its periphery to the frame 12a, but is only selectively adhered thereto by means of stripes of adhesive 21 on either side of the separator along two sides thereof. The adhesive stripes 21 may be of any selected adhesive material, and for example, of poly(ethylene/vinyl acetate), a hot melt polyamide adhesive or the like.

The paper component 32 is adhered to the cellophane component 31 of the separator 20 by any suitable means not offering any appreciable obstacle to the primary function of the paper component, which is to absorb and thereby immobilize electrolyte. As shown, the paper layer 32 is adhered to the cellophane sheet 31 by means of adhesive stripes 33.

The adhesive stripes 33 may be in registry with the adhesive stripes 21, as shown, or may each be located on one side or the other of the corresponding stripe 21 to facilitate handling.

Preferably, with reference to FIG. 3, the composite separator 20 is made by coating the stripes of adhesive 33, either on an elongated web of cellophane 31a or on a paper web 32a, and then laminating the cellophane and paper webs under heat and pressure. The stripes 21 can then be coated on the cellophane side of the composite web comprising the sheets 31a and 32a. Alternatively, in accordance with a presently preferred embodiment of the invention, the stripes 21 and 33 are both coated on the cellophane before lamination to the paper web.

The completed web comprising the sheets 31a and 32a, mutually adhered by the adhesive stripes 33 and coated on the cellophane side with the adhesive stripes 21, is preferably installed on a web of the frame material from which the frames such as 12a are made in a cut and place operation, during which individual separators 20 are cut from the composite web 31a, 32a, as where indicated by the dotted lines 35 in FIG. 3, and transferred and laminated to the perforated web of frame material. This process may be carried out as more fully described in the above-cited copending U.S. application Ser. No. 295,269, using the composite web 31a–32a in place of the stripped cellophane web described in application Ser. No. 295,269.

The components just described, comprising the metal terminal sheet 11, the frame 12, the conductive plastic layer 15 and its coating 16 of active anode particles, and the separator 20, are preferably formed in a manner described in detail in U.S. application Ser. No. 295,269 as a part of a single composite web which acts as an integral subassembly in the battery manufacturing process.

Overlying the composite separator 20 in this structure, as seen in FIG. 2, is a cathode 22 of any conventional composition, preferably formed in the specifically preferred embodiment to be described as a slurry of manganese dioxide and carbon particles in an aqueous electrolyte containing zinc chloride, ammonium chloride and a small amount of mercuric chloride in the initial assembly of the battery. As will be apparent to those skilled in the art, the mercury constituent of the mercuric chloride readily amalgamates with the zinc layer 16 after assembly of the battery and will not be present in the cathode slurry very long after the assembly of the battery. The cathode slurry 22 may be of any desired conventional composition, for example, those described in U.S. Pat. No. 4,119,770. In accordance with a presently preferred embodiment of the invention, a cathode slurry mix of the following composition is employed:

| Component | Weight Percent |
|---|---|
| MnO$_2$ | 40 |
| Carbon Black | 8 |
| ZnCl$_2$ | 12.9 |
| NH$_4$Cl | 1.0 |
| HgCl$_2$ | .5 |
| H$_2$O | 37.6 |
| | 100 |

The above composition and its properties are more fully described in copending U.S. application Ser. No. 295,267, filed on Aug. 24, 1981 by Pierre E. Nel and Joanne C. Pleskowicz for Laminar Electrical Cells and Batteries and assigned to the assignee of this invention.

If a single cell battery is to be constructed, its next layer would be a composite end terminal 4, in which, for that purpose, it would not be necessary to provide a pocket unless a relatively thick cathode was employed. However, for a multiple cell battery of the type shown in FIG. 2, the next layer over the cathode 22 would comprise another electrode assembly consisting of an electrochemically isolating layer of conductive plastic 15 identical to the lowermost layer 15 described above, on which there is coated a layer of active anode particles 16 as described previously.

As described above, the second conductive plastic layer 15 is laminated around its edges to a second frame 12b identical to the frame 12a for the lower cell just described. Following assembly of the battery in the form shown in FIG. 2, the layer 15 is in intimate contact with the first cathode layer 22.

In a manner analogous to that described in U.S. application Ser. No. 295,269, the group of components comprising the second frame 12b, with its intercell connector and electrode assembly comprising conductive plastic layer 15 and overlying active anode layer 16, together with another composite separator 20 adhered in place to the frame 12b by adhesive stripes 21, may be cut from a single composite web that serves as an integral subassembly in the process of manufacturing batteries in accordance with the invention.

Over the composite separator 20 attached to the frame 12b as just described is applied another cathode layer 22 of the same composition as the first described above. The assembly just described could be terminated as a two cell battery by adding the terminal assembly 4 as described above. However, in the specific embodiment shown in FIG. 2, a four cell battery is made by adding two more subassemblies comprising frames 12c and 12d, each formed integral with a conductive plastic sheet 15 over which a conductive layer 16 of zinc particles is applied, and over which zinc layer a composite separator 20 is partly adhered to adjacent portions of the frame by means of adhesive stripes 21.

A cathode layer 22 is deposited on top of each of the structures so described. The uppermost cathode is then covered by the terminal structure 4.

As shown in FIG. 2, the terminal structure 4 comprises a sheet of conductive plastic 23, of Condulon or the like, for example, of 2 mils in thickness, laminated to a cathode end terminal sheet 24 of metal, preferably of aluminum foil 2 mils in thickness and primed on the side adjacent the conductive plastic layer 23 with a thin coat of conductive plastic adhesive employed for the purpose of adhering the conductive plastic sheet 23 to the metal terminal 24 in a manner known in the art per se.

As mentioned above, the end terminal assembly 4 is preferably formed with a pocket comprising a central raised portion 25 as shown in FIGS. 1 and 2. Preferably, the pocketed terminal assembly 4 comprises a sheet of glassine paper 30 adhered to the metal terminal sheet 24 except over the portion comprising the tab 5. The glassine sheet 30 serves as an insulating layer in a manner more fully described in U.S. Pat. No. 4,019,251. The glassine sheet also serves to perform the further function of lubricating the die used to form the pocket 25, as described in more detail in copending U.S. application Ser. No. 295,269.

While the battery just described in connection with FIGS. 1 and 2 could be assembled by any of the techniques known to those skilled in the art for the assembly of laminar batteries, in accordance with the invention in its preferred embodiment it is assembled by the process described in copending U.S. application Ser. No. 295,269.

During the process of battery assembly, the edges of the battery are sealed under vacuum, at which time, referring to FIG. 2, a seal around the periphery is formed between the adhesive coated edges of the carrier sheet 9, corresponding regions of the aluminum side of the terminal sheet 11, the conductive plastic adhesive side of the sheet 11 and confronting margins of the frame 12a, the confronting margins on the frames 12a, 12b, 12c and 12d beyond the bounds of the composite separator 20, and the periphery of the conductive plastic layer 23 on the end terminal 4 confronting the upper face of the periphery of the frame 12d. During this process, or during the formation of the pocket 25 in the end terminal 4, or both, stresses may be induced in the conductive plastic sheet 23 which will result in minute fissures that could cause corrosion of the overlying aluminum sheet 24 if liquid electrolyte from the uppermost cathode 22 permeated into that region. The paper component 31 of the composite separator 20 has been found to effectively prevent this action.

The problem of electrolyte permeation through the conductive plastic sheet 23 on the terminal 4 has been found to be confined to the cell adjacent the pocketed end terminal 4. Accordingly, if desired, the composite separator 20 can be used only in the uppermost cell in FIG. 2, and simpler separators simply comprising sheets of cellophane 31 with stripes of adhesive 21 may be used in the other cells. Alternatively, for reasons of economy of inventory and simplicity in the manufacturing processes used to make the battery, or to take advantage of the additional margin of safety in cells adjacent the end cells, composite separators 20 may be used in more than one, or all, of the cells of the battery.

The bibulous material chosen for the elements 32 of the composite separator 20 should be relatively thin, in order to avoid an undue increase in the internal impedance of the battery. For example, 3 mil kraft paper of the kind usually proposed as a battery separator gives relatively poor results. Considerably lighter papers, in the range of 10 to 15 pounds per ream (one ream = 3000 ft$^2$), give results approaching those which can be attained without the paper component in those instances where the adverse effects of end cell corrosion do not degrade the performance of the battery. In particular, batteries of the kind here described more particularly suited for use in powering electronic flash units for providing illumination for photographic purposes. One test of the performance capability of a battery intended for this use is the number of recharge cycles that the battery can carry out, given a prescribed time interval for recovery between cycles. In a particular test protocol, the number of pulses of 50 watt seconds of energy delivered at a constant current of 2 amperes, with a rest interval between pulses of 30 seconds, which a battery can deliver before reaching a closed circuit voltage of 3.7 volts (for a four cell battery), is taken as the measure of performance capability. A comparison of batteries made in accordance with the preferred embodiment of the invention as described above with batteries made in the same way, but without a paper component 32 over the cellophane component 31 of the separator 20, is given in Table I below. The batteries of Examples A-E in Table I had four cells, with a composite separator 20 including a paper component of the caliper or weight specified in Table I in only the cell adjacent the pocketed end terminal, and cellophane separators without a paper component in the other cells. The papers used in Examples B-E were bleached kraft. The battery of Example F had cellophane separators without paper components in all cells.

TABLE I

| Example | Paper | Pulses to 3.7 Volts |
|---------|-------|---------------------|
| A | 3 mil kraft | 28 |
| B | 11 lb/ream | 39 |
| C | 10.5 lb/ream | 38 |
| D | 12.5 lb/ream | 41 |
| E | 15 lb/ream | 39 |
| F(Control) | none | 41 |

Batteries made in the same fashion, but without the cellophane component of the separator, were found incapable of producing any pulses in the test described above.

The use of a composite paper-cellophane separator in all cells of a four cell battery effects a decrease in pulse capacity, as illustrated in Table II below. In Table II, the batteries of Examples G and H were made with 15 pound per ream paper and cellophane, and the batteries of Example I were made with cellophane separators without paper components. The test results given refer to the pulse test as described above.

TABLE II

| Example | Pulses to 3.7 Volts |
|---------|---------------------|
| G | 27 |
| H | 24 |
| I | 41 |

While the invention has been described with reference to the details of various illustrative embodiments, many changes and variations will become apparent to those skilled in the art upon reading this description, and such can obviously be made without departing from the scope of the invention.

Having thus described the invention, what is claimed is:

1. A battery comprising a stack of laminar cells terminated at one end by an end terminal formed with a pocket, said end terminal comprising an external metal collector sheet laminated to a sheet of conductive plastic confronting the cell components, said cells each comprising at least one electrode comprising a slurry of electrochemically active particles in an aqueous electrolyte, a second electrode, and a separator between said slurry electrode and said second electrode, in which at least the separator in the cell adjacent said pocketed end terminal comprises a layer of regenerated cellulose in contact with said second electrode and a layer of porous bibulous material over said regenerated cellulose layer and in contact with said slurry electrode to limit migration of electrolyte from said slurry electrode.

2. The battery of claim 1, in which said porous bibulous material consists essentially of paper.

3. The battery of claim 1, in which the separators in all of the cells each comprise a layer of cellophane in contact with said second electrode and a layer of porous bibulous material over said regenerated cellulose layer.

4. A laminar electrical cell, comprising a powdered zinc anode adhered to a conductive substrate by a binder, a cathode slurry of manganese dioxide and carbon particles in an aqueous solution of electrolyte containing $NH_4Cl$ and $ZnCl_2$, and a composite separator between said anode and said cathode slurry, said separator comprising a layer of regenerated cellulose in contact with said anode and a layer of porous bibulous material over said regenerated cellulose layer and in contact with said cathode slurry to limit migration of electrolyte from said cathode slurry.

5. The cell of claim 4, in which said porous bibulous material is paper.

* * * * *